H. H. REED.
SELF CLOSING STANCHION.
APPLICATION FILED MAY 14, 1910.
991,021.
Patented May 2, 1911.
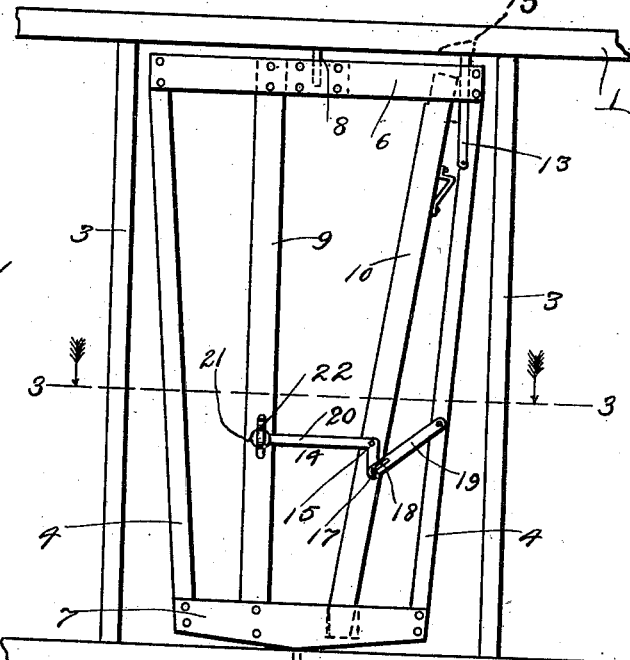
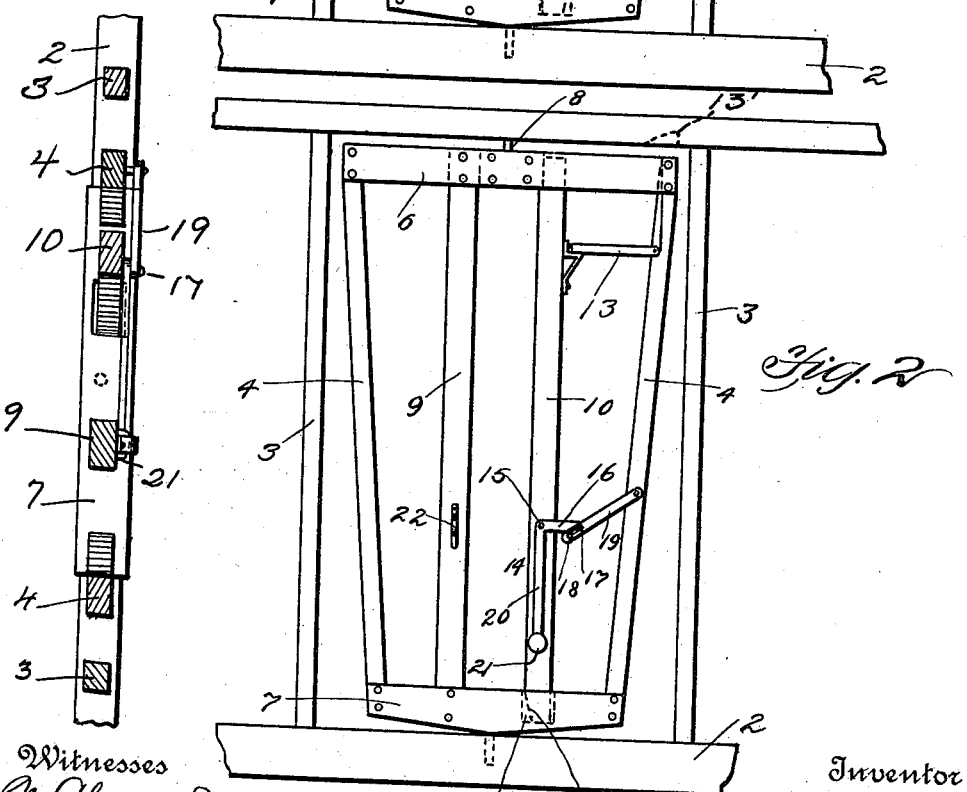
Witnesses
N. Abramson
M. L. Lowe
Inventor
Harry H. Reed
Woodward & Chandlee
Attorneys

UNITED STATES PATENT OFFICE.

HARRY H. REED, OF MARATHON, NEW YORK.

SELF-CLOSING STANCHION.

991,021.  Specification of Letters Patent.  Patented May 2, 1911.

Application filed May 14, 1910. Serial No. 561,373.

*To all whom it may concern:*

Be it known that I, HARRY H. REED, a citizen of the United States, residing at Marathon, in the county of Cortland and State of New York, have invented certain new and useful Improvements in Self-Closing Stanchions, of which the following is a specification.

This invention relates to stanchions and has for one of its objects to provide means adapted to be tripped by the animal whereby the stanchion will be automatically closed and locked.

Another object is to provide means for locking the stanchion in closed position.

With these and other objects in view, the invention consists in the construction, combination and arrangement of parts as will be hereinafter more fully described and pointed out in the claims, but it will be understood that changes in the specific structure may be made within the scope of the claims, without departing from the spirit of the invention.

In the drawings: Figure 1 is a front elevation of a stanchion in open position. Fig. 2 is a front elevation of a stanchion in closed and locked position. Fig. 3 is a cross section on the line 3—3, of Fig. 1, looking in the direction of the arrows.

Referring to the drawing it will be seen that the stationary frame of the stanchion is composed of the upper and lower stringers 1 and 2 and the uprights 3.

The movable frame of the stanchion comprises the downwardly converging side members 4, which are connected at their upper ends by the parallel spaced strips 6. The lower ends of the side members 4 of the movable frame are connected by the cross piece 7. The upper and lower connecting strips of the movable frame are swiveled at 8 to the stringers 1 and 2, and extending between the upper and lower cross pieces 6 and 7, and disposed to one side of the line of the pivots 8, is a bar 9, which constitutes the stationary stanchion bar. A movable stanchion bar 10 has its lower end 12 beveled at one edge and seated within a recess 11, formed in the lower cross piece 7. The upper end of the movable stanchion bar is adapted to play between the parallel strips 5 and 6 at the upper end of the swiveled frame.

A bolt 13 is pivoted to the side bar 4 of the stanchion frame near the upper end thereof, and is adapted to fall to one side and engage the outer edge of the movable stanchion bar 10. The bolt 13, when in its uppermost position is seated within a notched recess 13′, formed in the under face of the upper stringer 1, and in such position prevents the rotation of the swiveled frame until the animal has passed its head between the stationary bar 9 and the movable bar 10. When the bar 10 is released from the position shown in Fig. 1, the bolt 13 falls and engages against the edge of the said bar. The release of the bar 10 is accomplished by contact of the animal with the closing mechanism.

The closing mechanism comprises the angle lever 14 pivoted at its angle 15 to the movable bar 10, and having its arm 16 provided with a laterally projecting pin 17 adapted to engage and slide in a slot 18 formed in the outer end of the link 19, pivoted at one end to the side bar 4 of the movable frame. The arm 20 of the angle lever is provided on its outer end with a semi-spherical enlargement 21, which when the said lever is swung to the position shown in Fig. 2, will be engaged and held by the spring finger 22, secured on the stationary bar 9. The flat side of the weighted enlargement engages the bar 9 and the rounded side fits snugly within the embrace of the spring finger, until it is released therefrom by the animal. When the animal comes in contact with the arm 20 of the angle lever it will be pushed from the spring finger and by gravity fall into a vertical position, as shown, and through the arm 16 push against the link 19. This will cause the pin 17 to move along said slot until it bears against the end wall of the horizontal portion of the slot 18, and pressing thereagainst communicate movement to the bar 10 forcing the said bar into upright or operative position. Upon the bar 10 assuming a vertical position, the latch 13 will fall into the position shown in Fig. 2, against the edge of the bar 10, and hold the said bar in locked and operative position. The animal cannot, then, remove its head from between the stanchion bars, until the said latch is raised by hand. In the initial movement in the fall of the lever 14, the pin 17 rides in the horizontal portion of the slot 18, until the said lever is in an almost vertically depending position, when the pin strikes the inner end wall of the slot. This causes a lost motion between the lever and link, and the impact against said end wall forces the bar 10 into its operative position. The slot 18 is open at one end of its vertical portion, for the purpose of readily removing the link from engagement with the pin, when it becomes necessary to inspect or repair the parts.

To open the stanchion, the latch 13 is first raised by hand, and seated in the recess 13' in the upper stringer, and the lever 14 raised until its weighted end is embraced by the spring finger. This movement of the lever produces a reversal of the movement above described. The engagement of the latch 13 within the recess 13' provides a locking connection between the stationary frame and the movable frame, to prevent the rotation of the movable frame. This insures the swiveled frame being in the proper position to receive the head of the animal, and the disengagement of the said parts permits the animal to readily move its head from side to side.

From the foregoing it will readily be seen that I have provided a simple and efficient stanchion, and one which is closed automatically when tripped by the animal. Also, I have provided a stanchion which insures the steady position of the movable frame so as to present the opening for the animal's head in the proper position.

What is claimed is:

1. A cattle stanchion comprising a stationary frame, a movable frame rotatably mounted in the stationary frame, a stationary confining member in the movable frame, a movable confining member in the movable frame, said movable confining member adapted to move toward and away from the stationary confining member, a lever pivoted to the movable confining member and comprising a horizontal and a vertical arm, said horizontal arm adapted to extend across the confining members and detachably engage at its free end with means on the stationary confining member, a link pivoted at one end to the movable frame and having its other end pivotally and removably connected to the vertical arm of the lever, whereby when the lever is released from the stationary confining member by contact of an animal, the said lever will fall and draw the movable confining member into operative position.

2. A cattle stanchion comprising a stationary frame, a movable frame rotatably mounted in the stationary frame, a stationary confining member in the movable frame, a movable confining member also mounted in the movable frame, a lever comprising a longer and a shorter arm and mounted on said movable confining member, a weight on the free end of the longer arm adapted to engage and be held by a means on the stationary confining member, a link pivotally connected to the movable frame at one end thereof, and having its other end formed with an open ended angular slot, a pin on the shorter arm of the said lever adapted to slidably engage in the slot of the said link, whereby the lever communicates movement through its shorter arm and the said link to move the movable confining member into operative position, when the said lever is released by contact of an animal.

In testimony whereof I affix my signature, in presence of two witnesses.

HARRY H. REED.

Witnesses:
  JAMES H. TRIPP,
  THOMAS M. REAGAN.

---

Copies of this patent may be obtained for five cents each, by addressing the "Commissioner of Patents, Washington, D. C."